(12) United States Patent
Casetti et al.

(10) Patent No.: US 10,197,017 B2
(45) Date of Patent: Feb. 5, 2019

(54) FUEL VAPOR SYSTEM DIAGNOSTIC SYSTEMS AND METHODS

(71) Applicant: GM Global Technology Operations LLC, Detroit, MI (US)

(72) Inventors: Martino Casetti, Clarkston, MI (US); Darrell W. Burleigh, Fenton, MI (US); Bruce A. Church, South Lyon, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 54 days.

(21) Appl. No.: 15/251,709

(22) Filed: Aug. 30, 2016

(65) Prior Publication Data

US 2017/0152813 A1    Jun. 1, 2017

Related U.S. Application Data

(60) Provisional application No. 62/261,585, filed on Dec. 1, 2015.

(51) Int. Cl.
    *F02M 25/08* (2006.01)
    *B01D 53/04* (2006.01)
    (Continued)

(52) U.S. Cl.
    CPC ..... *F02M 25/0809* (2013.01); *B01D 53/0407* (2013.01); *F02D 41/0032* (2013.01);
    (Continued)

(58) Field of Classification Search
    CPC .. F02D 41/0032; F02D 41/221; F02D 41/222; F02D 41/223; F02D 41/224; F02D 41/225; F02D 41/22; F02D 41/3082; F02D 2041/223; F02D 2041/1409; F02D 2041/141; G07C 5/006; G07C 5/0808; G07C 5/0825; F02M 25/0809;
    (Continued)

(56) References Cited

U.S. PATENT DOCUMENTS

| 6,227,177 B1 | 5/2001 | Yamafuji et al. |
| 8,104,333 B2 * | 1/2012 | Takakura ........... F02M 25/0809 73/114.39 |

(Continued)

OTHER PUBLICATIONS

U.S. Appl. No. 15/251,534, filed Aug. 30, 2016, Casetti et al.
U.S. Appl. No. 15/251,806, filed Aug. 30, 2016, Casetti et al.
U.S. Appl. No. 15/251,844, filed Aug. 30, 2016, Casetti et al.

*Primary Examiner* — Hai H Huynh
*Assistant Examiner* — Gonzalo Laguarda

(57) ABSTRACT

A fuel vapor system for a vehicle includes a fuel vapor canister that traps fuel vapor from a fuel tank of the vehicle. A purge valve opens to allow fuel vapor flow to an intake system of an engine and closes to prevent fuel vapor flow to the intake system of the engine. An electrical pump pumps fuel vapor from the fuel vapor canister to the purge valve. A diagnostic module (a) selectively diagnoses a fault in the fuel vapor system based on at least one of: (i) a speed of the electrical pump measured using a pump speed sensor; and (ii) a pressure at a location between the electrical pump and the purge valve, and (b) illuminates a malfunction indicator lamp (MIL) within a passenger cabin of the vehicle when the fault is diagnosed.

18 Claims, 13 Drawing Sheets

(51) Int. Cl.
*F02D 41/00* (2006.01)
*F02D 41/14* (2006.01)
*F02D 41/22* (2006.01)
*G07C 5/08* (2006.01)
*G07C 5/00* (2006.01)

(52) U.S. Cl.
CPC ....... *F02D 41/1401* (2013.01); *F02D 41/222* (2013.01); *G07C 5/006* (2013.01); *G07C 5/0808* (2013.01); *G07C 5/0825* (2013.01); *B01D 2257/7022* (2013.01); *B01D 2259/4516* (2013.01); *F02D 2041/141* (2013.01); *F02D 2041/1409* (2013.01); *F02D 2041/223* (2013.01); *Y02T 10/40* (2013.01)

(58) Field of Classification Search
CPC ........ B01D 53/0407; B01D 2257/7022; B01D 2259/4516; Y02T 10/40
USPC ................ 123/520, 497; 701/107; 73/114.39
See application file for complete search history.

(56) References Cited

U.S. PATENT DOCUMENTS

| | | | |
|---|---|---|---|
| 9,038,489 B2 * | 5/2015 | Jackson | F02M 25/0809 73/114.39 |
| 9,518,540 B2 * | 12/2016 | Pearce | F02M 33/025 |
| 9,562,499 B2 | 2/2017 | Swartz et al. | |
| 9,752,539 B2 | 9/2017 | Burleigh et al. | |
| 9,850,853 B2 | 12/2017 | Dudar et al. | |
| 2001/0032637 A1 | 10/2001 | Grieve et al. | |
| 2003/0091443 A1 * | 5/2003 | Sabini | F04D 15/0066 417/53 |
| 2006/0225713 A1 | 10/2006 | Kano et al. | |
| 2007/0227515 A1 | 10/2007 | Uchida | |
| 2010/0223984 A1 | 9/2010 | Pursifull et al. | |
| 2010/0235072 A1 | 9/2010 | Okazaki | |
| 2010/0300413 A1 | 12/2010 | Ulrey et al. | |
| 2011/0132331 A1 | 6/2011 | Pursifull | |
| 2011/0307157 A1 | 12/2011 | Pursifull | |
| 2013/0213366 A1 | 8/2013 | Weigl | |
| 2013/0233287 A1 | 9/2013 | Leone | |
| 2013/0253798 A1 | 9/2013 | Ramappan et al. | |
| 2013/0253799 A1 | 9/2013 | Peters et al. | |
| 2014/0005912 A1 | 1/2014 | Ide et al. | |
| 2014/0060498 A1 | 3/2014 | Hasegawa et al. | |
| 2014/0297071 A1 | 10/2014 | Dudar et al. | |
| 2015/0159597 A1 | 6/2015 | Woods et al. | |
| 2015/0198123 A1 | 7/2015 | Pearce et al. | |
| 2016/0017849 A1 * | 1/2016 | Shirai | F02D 41/004 123/520 |
| 2016/0108864 A1 | 4/2016 | Tochihara et al. | |
| 2016/0258389 A1 | 9/2016 | Makino | |
| 2017/0342919 A1 * | 11/2017 | Dekar | F02D 41/0045 |

* cited by examiner

FUEL VAPOR SYSTEM DIAGNOSTIC SYSTEMS AND METHODS

CROSS-REFERENCE TO RELATED APPLICATIONS

This application claims the benefit of U.S. Provisional Application No. 62/261,585, filed on Dec. 1, 2015. The disclosure of the above application is incorporated herein by reference in its entirety.

This application is related to U.S. patent application Ser. No. 15/251,534 filed on Aug. 30, 2016, Ser. No. 15/251,806 filed on Aug. 30, 2016, Ser. No. 15/251,844 filed on Aug. 30, 2016. The disclosures of the above applications are incorporated herein by reference in their entirety.

FIELD

The present disclosure relates to internal combustion engines and more specifically to fuel vapor control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. A vapor purge system provides the engine with fuel vapor drawn from a vapor canister.

Liquid fuel is stored within the fuel tank. In some circumstances, the liquid fuel may vaporize and form fuel vapor. The vapor canister traps and stores the fuel vapor. The purge system includes a purge valve. Operation of the engine causes a vacuum (low pressure relative to atmospheric pressure) to form within an intake manifold of the engine. The vacuum within the intake manifold and selective actuation of the purge valve allows the fuel vapor to be drawn into the intake manifold and purge the fuel vapor from the vapor canister.

SUMMARY

In a feature, a fuel vapor system for a vehicle is described. A fuel vapor canister traps fuel vapor from a fuel tank of the vehicle. A purge valve opens to allow fuel vapor flow to an intake system of an engine and closes to prevent fuel vapor flow to the intake system of the engine. An electrical pump pumps fuel vapor from the fuel vapor canister to the purge valve. A diagnostic module (a) selectively diagnoses a fault in the fuel vapor system based on at least one of: (i) a speed of the electrical pump measured using a pump speed sensor; and (ii) a pressure at a location between the electrical pump and the purge valve, and (b) illuminates a malfunction indicator lamp (MIL) within a passenger cabin of the vehicle when the fault is diagnosed.

In further features, the diagnostic module diagnoses the fault when the speed of the electrical pump measured using the pump speed sensor is greater than a predetermined maximum speed measurable by the pump speed sensor.

In further features, the diagnostic module diagnoses the fault when the speed of the electrical pump measured using the pump speed sensor is less than a predetermined minimum speed measurable by the pump speed sensor.

In further features, the diagnostic module diagnoses the fault when a difference between the speed of the electrical pump measured using the pump speed sensor and a target speed of the electrical pump is one of: greater than a first predetermined speed that is greater than zero; and less than a second predetermined speed that is less than zero.

In further features, the diagnostic module: selectively closes the purge valve when the electrical pump is on; and diagnoses the fault based on an average of values of the pressure at the location between the electrical pump and the purge valve taken after the closing of the purge valve.

In further features, the diagnostic module closes the purge valve in response to a determination that the speed of the electrical pump is greater than a predetermined speed.

In further features, the diagnostic module diagnoses the fault when the average of the values of the pressure at the location between the electrical pump and the purge valve taken after the closing of the purge valve is less than a predetermined pressure.

In further features, the diagnostic module further: selectively opens the purge valve after the closing of the purge valve; and diagnoses the fault when the pressure at the location between the electrical pump and the purge valve is not less than a predetermined pressure within a predetermined period after the opening of the purge valve.

In further features, the diagnostic module opens the purge valve after the closing of the purge valve when the average is greater than a second predetermined pressure that is greater than the predetermined pressure.

In further features, the diagnostic module: determines a measured value based on a barometric pressure and the pressure at the location between the electrical pump and the purge valve; determines an expected value based on the barometric pressure and a target pressure at the location between the electrical pump and the purge valve; and selectively diagnoses the fault based on the measured value and the expected value.

In a feature, a method includes: pumping, using an electrical pump, fuel vapor from a fuel vapor canister to a purge valve, the fuel vapor canister trapping fuel vapor from a fuel tank of the vehicle; selectively opening the purge valve to allow fuel vapor flow to an intake system of an engine; selectively closing the purge valve to prevent fuel vapor flow to the intake system of the engine; selectively diagnosing a fault in a fuel vapor system based on at least one of: (i) a speed of the electrical pump measured using a pump speed sensor; and (ii) a pressure at a location between the electrical pump and the purge valve; and illuminating a malfunction indicator lamp (MIL) within a passenger cabin of the vehicle when the fault is diagnosed.

In further features, the method further includes diagnosing the fault when the speed of the electrical pump measured using the pump speed sensor is greater than a predetermined maximum speed measurable by the pump speed sensor.

In further features, the method further includes diagnosing the fault when the speed of the electrical pump measured using the pump speed sensor is less than a predetermined minimum speed measurable by the pump speed sensor.

In further features, the method further includes diagnosing the fault when a difference between the speed of the electrical pump measured using the pump speed sensor and a target speed of the electrical pump is one of: greater than a first predetermined speed that is greater than zero; and less than a second predetermined speed that is less than zero.

In further features, the method further includes: selectively closing the purge valve when the electrical pump is on; and diagnosing the fault based on an average of values of the pressure at the location between the electrical pump and the purge valve taken after the closing of the purge valve.

In further features, selectively closing the purge valve includes closing the purge valve in response to a determination that the speed of the electrical pump is greater than a predetermined speed.

In further features, the method further includes diagnosing the fault when the average of the values of the pressure at the location between the electrical pump and the purge valve taken after the closing of the purge valve is less than a predetermined pressure.

In further features, the method further includes: selectively opening the purge valve after the closing of the purge valve; and diagnosing the fault when the pressure at the location between the electrical pump and the purge valve is not less than a predetermined pressure within a predetermined period after the opening of the purge valve.

In further features, selectively opening the purge valve includes opening the purge valve after the closing of the purge valve when the average is greater than a second predetermined pressure that is greater than the predetermined pressure.

In further features, the method further includes: determining a measured value based on a barometric pressure and the pressure at the location between the electrical pump and the purge valve; determining an expected value based on the barometric pressure and a target pressure at the location between the electrical pump and the purge valve; and selectively diagnosing the fault based on the measured value and the expected value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts a mixture of air and fuel to produce torque. Fuel injectors may inject liquid fuel drawn from a fuel tank. Some conditions, such as heat, radiation, and fuel type may cause fuel to vaporize within the fuel tank. A vapor canister traps fuel vapor, and the fuel vapor may be provided from the vapor canister through a purge valve to the engine. In naturally aspirated engines, vacuum within an intake manifold may be used to draw fuel vapor from the vapor canister when the purge valve is open.

According to the present application, an electrical pump pumps fuel vapor from the vapor canister to the purge valve and, when the purge valve is open, to the intake system. The electrical pump may pump fuel vapor, for example, to an intake system of the engine at a location upstream of a boost device of the engine. The electrical pump may be a fixed speed pump or a variable speed pump. A pressure sensor measures pressure at a location between the purge valve and the electrical pump.

Measurements of the pressure sensor may drift over time. As such, a control module determines a pressure offset for the pressure sensor based on a difference between a measurement provided by the pressure sensor and an expected value of the measurement. For example, the control module may determine the pressure offset based on a difference between a measurement of the pressure sensor and barometric pressure when pressure at the pressure sensor is expected to be approximately barometric pressure. The control module adjusts the measurements of the pressure sensor based on the pressure offset.

The control module also diagnoses various faults associated with the fuel vapor purge system based on pressure measured using the pressure sensor and/or a speed of the electrical pump measured using a speed sensor. The control module may store a predetermined diagnostic trouble code (DTC) associated with a fault in memory when that fault is diagnosed. The control module may also illuminate a malfunction indicator lamp (MIL) and take one or more other remedial actions (e.g., disable fuel vapor purging) when a fault is diagnosed.

Figure 1:
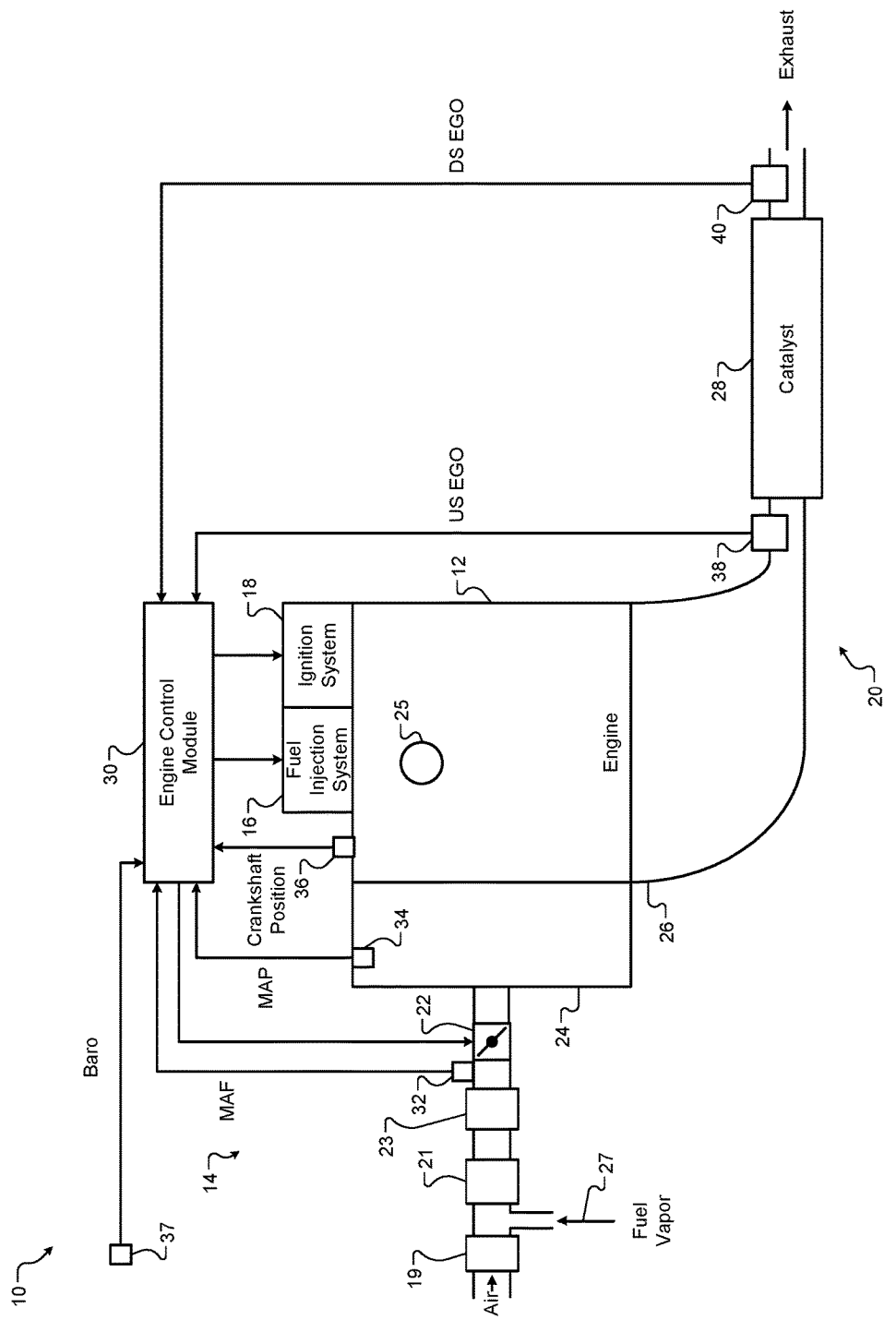
FIG. 1 is a functional block diagram of an example engine system.

Referring now to FIG. 1, a functional block diagram of an example engine system 10 is presented. The engine system 10 includes an engine 12, an intake system 14, a fuel injection system 16, a (spark) ignition system 18, and an exhaust system 20. While the engine system 10 is shown and will be described in terms of a gasoline engine, the present application is applicable to hybrid engine systems and other suitable types of engine systems having a fuel vapor purge system.

The intake system 14 may include an air filter 19, a boost device 21, a throttle valve 22, a charge cooler 23, and an intake manifold 24. The air filter 19 filters air flowing into the engine 12. The boost device 21 may be, for example, a turbocharger or a supercharger. While the example of one boost device is provided, more than 1 boost device may be included. The charge cooler 23 cools the gas output by the boost device 21.

The throttle valve 22 controls air flow into the intake manifold 24. Air flows from the intake manifold 24 into one or more cylinders within the engine 12, such as cylinder 25. While only the cylinder 25 is shown, the engine 12 may include more than one cylinder. The fuel injection system 16 includes a plurality of fuel injectors and controls (liquid) fuel injection for the engine 12. As discussed further below (e.g., see FIG. 2), fuel vapor 27 is also provided to the engine 12 under some circumstances. For example, the fuel vapor 27 may be introduced at a location between the air filter 19 and the boost device 21.

Exhaust resulting from combustion of the air/fuel mixture is expelled from the engine 12 to the exhaust system 20. The exhaust system 20 includes an exhaust manifold 26 and a catalyst 28. For example only, the catalyst 28 may include a three way catalyst (TWC) and/or another suitable type of catalyst. The catalyst 28 receives the exhaust output by the engine 12 and reacts with various components of the exhaust.

The engine system 10 also includes an engine control module (ECM) 30 that regulates operation of the engine system 10. The ECM 30 controls engine actuators, such as the boost device 21, the throttle valve 22, the intake system 14, the fuel injection system 16, and the ignition system 18. The ECM 30 also communicates with various sensors. For example only, the ECM 30 may communicate with a mass air flow (MAF) sensor 32, a manifold air pressure (MAP) sensor 34, a crankshaft position sensor 36, and other sensors.

The MAF sensor 32 measures a mass flowrate of air flowing through the throttle valve 22 and generates a MAF signal based on the mass flowrate. The MAP sensor 34 measures a pressure within the intake manifold 24 and generates a MAP signal based on the pressure. In some implementations, vacuum within the intake manifold 24 may be measured relative to ambient (barometric) pressure.

The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). A barometric pressure sensor 37 measures barometric air pressure and generates a barometric air pressure signal based on the barometric air pressure. While the barometric pressure sensor 37 is illustrated as being separate from the intake system 14, the barometric pressure sensor 37 may be measured within the intake system 14, such as between the air filter 19 and the boost device 21 or upstream of the air filter 19.

The ECM 30 also communicates with exhaust gas oxygen (EGO) sensors associated with the exhaust system 20. For example only, the ECM 30 communicates with an upstream EGO sensor (US EGO sensor) 38 and a downstream EGO sensor (DS EGO sensor) 40. The US EGO sensor 38 is located upstream of the catalyst 28, and the DS EGO sensor 40 is located downstream of the catalyst 28. The US EGO sensor 38 may be located, for example, at a confluence point of exhaust runners (not shown) of the exhaust manifold 26 or at another suitable location.

The US and DS EGO sensors 38 and 40 measure amounts of oxygen in the exhaust at their respective locations and generate EGO signals based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28. The US and DS EGO sensors 38 and 40 may each include a switching EGO sensor, a universal EGO (UEGO) sensor (also referred to as a wide band or wide range EGO sensor), or another suitable type of EGO sensor. The ECM 30 may control the fuel injection system 16 based on measurements from the US and DS EGO sensors 38 and 40.

Figure 2:
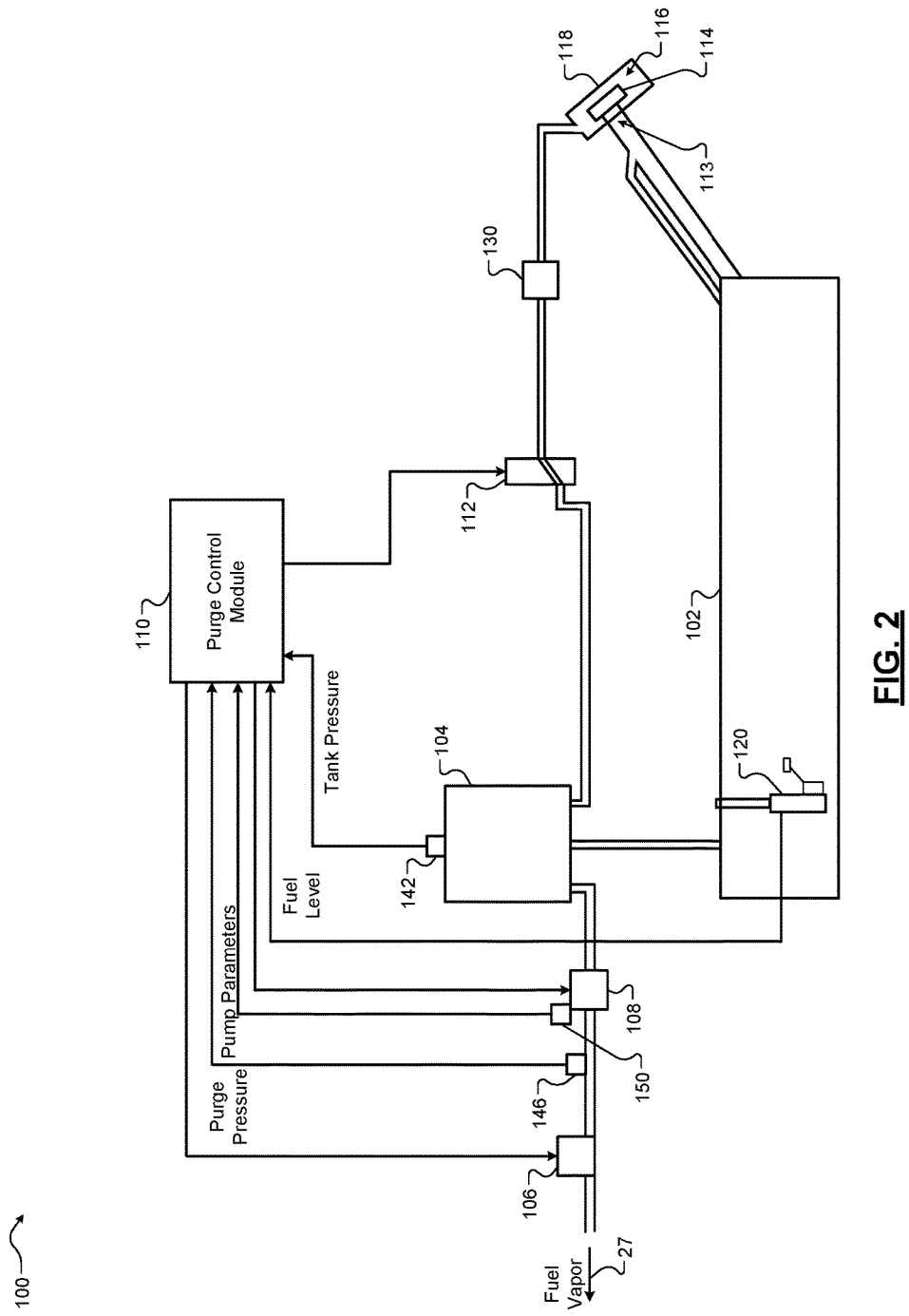
FIG. 2 is a functional block diagram of an example fuel control system.

Referring now to FIG. 2, a functional block diagram of an example fuel control system is presented. A fuel system 100 supplies liquid fuel and the fuel vapor to the engine 12. The fuel system 100 includes a fuel tank 102 that contains liquid fuel. One or more fuel pumps (not shown) draw liquid fuel from the fuel tank 102 and provide the fuel to the fuel injection system 16.

Some conditions, such as heat, vibration, and radiation, may cause liquid fuel within the fuel tank 102 to vaporize. A vapor canister 104 traps and stores vaporized fuel (i.e., the fuel vapor 27). The vapor canister 104 may include one or more substances that trap and store fuel vapor, such as one or more types of charcoal.

A purge valve 106 may be opened to allow fuel vapor flow from the vapor canister 104 to the intake system 14. More specifically, a purge pump 108 pumps fuel vapor from the vapor canister 104 to the purge valve 106. The purge valve 106 may be opened to allow the pressurized fuel vapor from the purge pump 108 to flow to the intake system 14. A purge control module 110 controls the purge valve 106 and the purge pump 108 to control the flow of fuel vapor to the engine 12. While the purge control module 110 and the ECM 30 are shown and discussed as being independent modules, the ECM 30 may include the purge control module 110.

The purge control module 110 also controls a vent valve 112. The purge control module 110 may open the vent valve 112 to a vent position when the purge pump 108 is on to draw fresh air toward the vapor canister 104. Fresh air is drawn into the vapor canister 104 through the vent valve 112 as fuel vapor flows from the vapor canister 104. The purge control module 110 controls fuel vapor flow to the intake system 14 by controlling the purge pump 108 and opening and closing of the purge valve 106 while the vent valve 112 is in the vent position. The purge pump 108 allows fuel vapor to flow without the need for vacuum within the intake system 14.

A driver of the vehicle may add liquid fuel to the fuel tank 102 via a fuel inlet 113. A fuel cap 114 seals the fuel inlet 113. The fuel cap 114 and the fuel inlet 113 may be accessed via a fueling compartment 116. A fuel door 118 may be implemented to shield and close the fueling compartment 116.

A fuel level sensor 120 measures an amount of liquid fuel within the fuel tank 102. The fuel level sensor 120 generates a fuel level signal based on the amount of liquid fuel within the fuel tank 102. For example only, the amount of liquid fuel in the fuel tank 102 may be expressed as a volume, a percentage of a maximum volume of the fuel tank 102, or another suitable measure of the amount of fuel in the fuel tank 102.

The fresh air provided to the vapor canister 104 through the vent valve 112 may be drawn from the fueling compartment 116 in various implementations, although the vent valve 112 may draw fresh air from another suitable location. A filter 130 may be implemented to filter various particulate from the ambient air flowing to the vent valve 112. A tank pressure sensor 142 measures a tank pressure within the fuel tank 102. The tank pressure sensor 142 generates a tank pressure signal based on the tank pressure within the fuel tank 102.

A purge pressure sensor 146 measures a purge pressure at a location between the purge pump 108 and the purge valve 106. The purge pressure sensor 146 generates a purge pressure signal based on the purge pressure at the location between the purge pump 108 and the purge valve 106.

The purge pump 108 is an electrical pump and includes an electrical motor that drives the purge pump 108. The purge pump 108 is not a mechanical pump that is driven by a rotating component of the vehicle, such as the crankshaft of the engine. The purge pump 108 may be a fixed speed pump or a variable speed pump.

One or more pump sensors 150 measure operating parameters of the purge pump 108 and generate signals accordingly. For example, the pump sensors 150 include a pump speed sensor that measures a rotational speed of the purge pump 108 and generates a pump speed signal based on the speed of the purge pump 108. The pump sensors 150 may also include a pump current sensor, a pump voltage sensor, and/or a pump power sensor. The pump current sensor, the pump voltage sensor, and the pump power sensor measure current to the purge pump 108, voltage applied to the purge pump 108, and power consumption of the purge pump 108, respectively.

Figure 3:
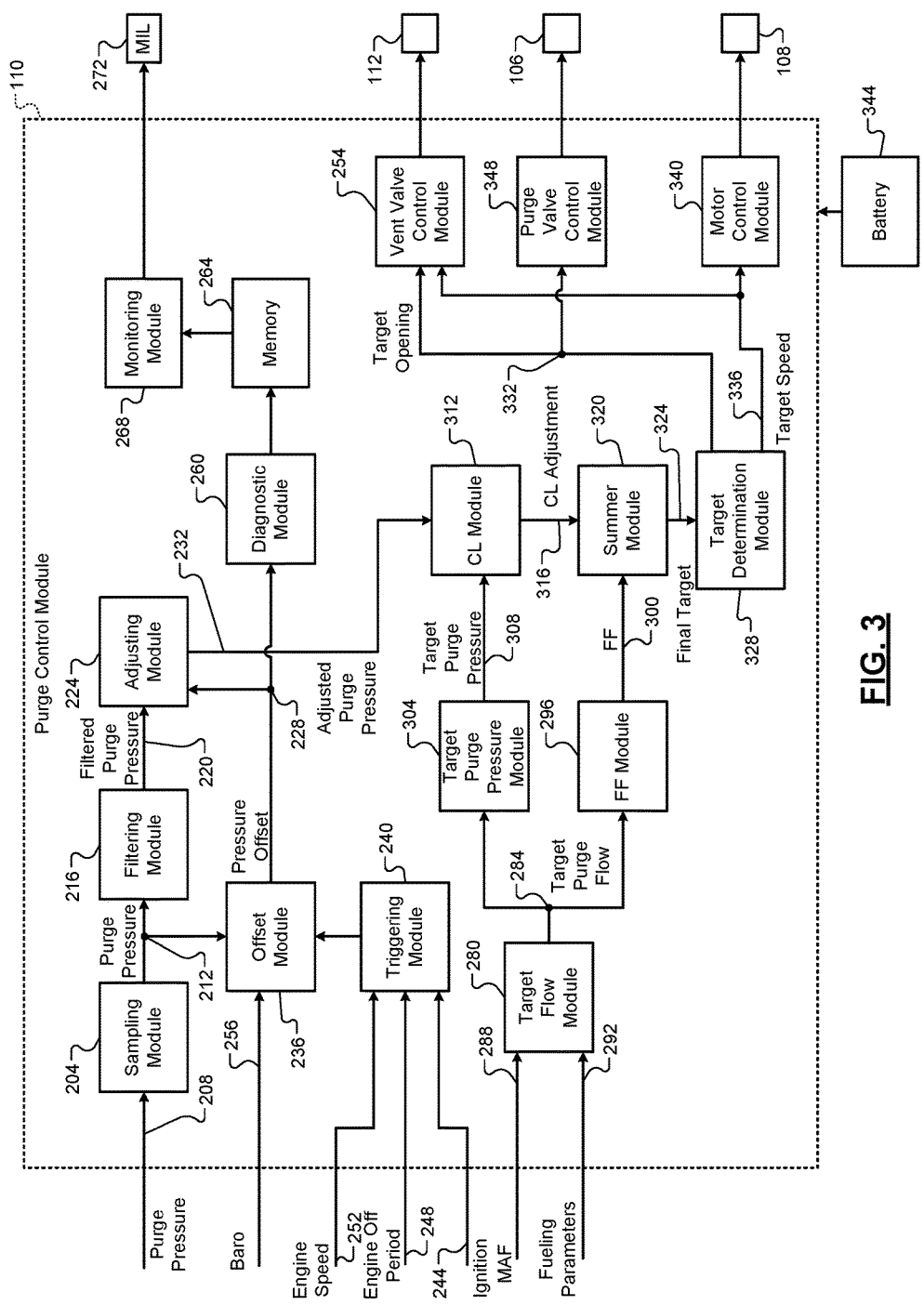
FIG. 3 if a functional block diagram of an example implementation of a purge control module.

Referring now to FIG. 3, a functional block diagram of an example implementation of the purge control module 110 is presented. A sampling module 204 samples the purge pressure signal 208 from the purge pressure sensor 146 at a predetermined sampling rate and outputs purge pressure samples 212. The sampling module 204 may also digitize, buffer, filter, and/or perform one or more functions on the samples. In various implementations, the purge pressure sensor 146 may perform the functions of the sampling module 204 and provide the purge pressure 212.

A filtering module 216 filters the purge pressure 212 using one or more filters to produce a filtered purge pressure 220. For example only, the filtering module 216 may apply a low pass filter or a first-order lag filter to the purge pressure samples to produce the filtered purge pressure 220.

The measurements of the purge pressure sensor 146 may drift over time. In other words, the purge pressure signal 208 may be different than expected given actual pressure. An adjusting module 224 therefore adjusts the filtered purge pressure 220 based on a pressure offset 228 to produce adjusted purge pressure 232. For example only, the adjusting module 224 may sum or multiply the pressure offset 228 with the filtered purge pressure 220 to produce the adjusted purge pressure 232. As discussed further below, the adjusted purge pressure 232 may be used, for example, to control opening of the purge valve 106 and/or to control the purge pump 108. While the example sequence of sampling, filtering, and adjusting based on the pressure offset 228 have been provided, another sequence may be used.

When triggered, an offset module 236 determines the pressure offset 228. A triggering module 240 triggers the offset module 236 when the purge pressure at the location of the purge pressure sensor 146 should be at an expected pressure, such as barometric pressure.

For example, the triggering module 240 may trigger the offset module 236 when a driver actuates an ignition key, button, or switch to start the vehicle, before engine cranking begins, and the engine 12 was off (shut down) for at least a predetermined period before the driver actuation of the ignition system. Additionally or alternatively, the triggering module 240 may trigger the offset module 236 when the purge pump 108 has been off for greater than the predetermined period and/or the speed of the purge pump 108 is zero or approximately zero. An ignition signal 244 may indicate driver actuation of the ignition key, button, or switch. An engine off period 248 may correspond to a period that the engine 12 was off between a time when the driver actuated the ignition key, button, or switch, and a last time when the driver shut down the engine 12. The predetermined period may be set based on a period for the pressure at the purge pressure sensor 146 to reach the expected (e.g., barometric) pressure.

An engine speed 252 corresponds to a rotation speed of the engine 12 (e.g., the crankshaft) and may be determined, for example, based on crankshaft position measured using the crankshaft position sensor 36. The engine speed 252 being zero or less than a predetermined speed may indicate that engine cranking has not yet begun. A vent valve control module 254 may actuate the vent valve 112 to the vent position when the engine 12 is off to allow the pressure at the purge pressure sensor 146 to approach barometric pressure.

When triggered, the offset module 236 may set the pressure offset 228, for example, based on or equal to a difference between the purge pressure 212 and barometric pressure 256. The pressure offset 228 therefore corresponds to how far the purge pressure 212 may be from an actual pressure at the purge pressure sensor 146 at that time. The barometric pressure 256 may be measured, for example, using the barometric pressure sensor 37. In various implementations, a predetermined pressure may be used in place of the barometric pressure 256. In various implementations, pressure measured by the tank pressure sensor 142 may be used in place of the barometric pressure 256.

A diagnostic module 260 selectively diagnoses the presence of a fault associated with the purge pressure sensor 146 based on the pressure offset 228. The diagnostic module 260 may diagnose the fault, for example, when a magnitude of the pressure offset 228 is greater than a predetermined pressure that is greater than zero. The diagnostic module 260 may indicate that the fault is not present, for example, when the magnitude of the pressure offset 228 is less than the predetermined pressure. In various implementations, the diagnostic module 260 may diagnose the fault when the pressure offset 228 is greater than a predetermined positive pressure or less than (i.e., more negative than) a predetermined negative pressure.

The predetermined pressure(s) may be fixed or variable. In the example of the predetermined pressure(s) being variable, the diagnostic module 260 may determine the predetermined pressure(s), for example, based on current to the purge pump 108, voltage applied to the purge pump 108, or power consumption of the purge pump 108. The diagnostic module 260 may determine the predetermined pressure, for example, using a function or mapping that relates current, voltage, and/or power consumption of the purge pump 108 to predetermined pressures. The densities of fuel vapor and air may be different. As such, current, voltage, and/or power consumption of the purge pump 108 may vary as the composition of gas at the purge pump 108 changes.

The predetermined pressure(s) may therefore vary based on current, voltage, and/or power consumption of the purge pump 108.

The diagnostic module 260 may take one or more remedial actions when the fault is present. For example, the diagnostic module 260 may store a predetermined diagnostic trouble code (DTC) in memory 264 when the fault associated with the purge pressure sensor 146 is diagnosed. The predetermined DTC may correspond to the fault associated with the purge pressure sensor 146. A monitoring module 268 may monitor the memory 264 and illuminate a malfunction indicator lamp (MIL) 272 within a passenger cabin of the vehicle when one or more DTCs are stored in the memory 264. The MIL 272 may visually indicate to drivers to seek vehicle service. The predetermined DTC may indicate, to a vehicle service technician, of the presence of a fault associated with the purge pressure sensor 146. The diagnostic module 260 may additionally or alternatively take one or more other remedial actions when the fault is present, such as disabling closed loop control based on the adjusted purge pressure 232, which is discussed further below, or disabling fuel vapor purging.

Figure 4:
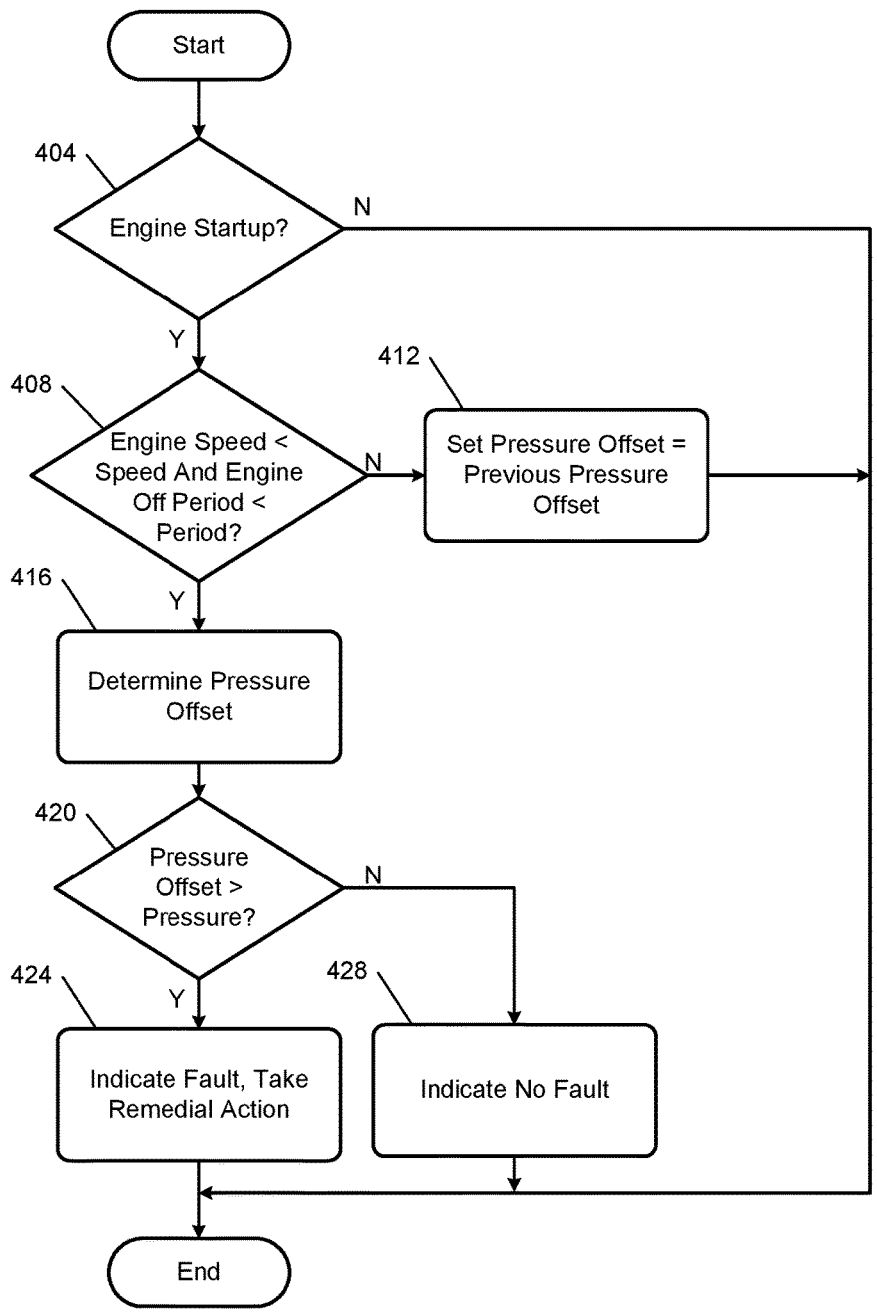
FIG. 4 is a flowchart depicting an example method of determining a pressure offset and diagnosing a fault associated with a purge pressure sensor.

FIG. 4 is a flowchart depicting an example method of determining the pressure offset 228 and diagnosing the fault associated with the purge pressure sensor 146. Control may begin with 404 where the triggering module 240 may determine whether the driver actuated the ignition key, button, or switch to start the engine 12. If 404 is true, control continues with 408. If 404 is false, control may end.

At 408, the triggering module 240 may determine whether the engine speed 252 is less than the predetermined speed and the engine off period 248 is greater than the predetermined period. Additionally or alternatively, the triggering module 240 may determine whether the purge pump 108 has been off for greater than the predetermined period and/or the speed of the purge pump 108 is zero or approximately zero. If 408 is false, the offset module 236 may set the pressure offset 228 equal to the value of the pressure offset 228 used before the engine 12 was shut down at 412, and control may end. If 408 is true, control may continue with 416.

The offset module 236 sets the pressure offset 228 based on or equal to a difference between the purge pressure 212 and the expected pressure at 416. The expected pressure may be, for example, the barometric pressure 256, a predetermined pressure, or the tank pressure. The adjusting module 224 adjusts the filtered purge pressure 220 based on the pressure offset 228 to determine the adjusted purge pressure 232, as discussed above. For example, the adjusting module 224 may set the adjusted purge pressure 232 equal to or based on a sum or a product of the pressure offset 228 with the filtered purge pressure 220.

At 420, the diagnostic module 260 determines whether the pressure offset 228 is indicative of the fault associated with the purge pressure sensor 146. For example, the diagnostic module 260 may determine whether the magnitude of the pressure offset 228 is greater than the predetermined pressure, whether the pressure offset 228 is greater than the predetermined positive pressure, and/or whether the pressure offset 228 is less than the predetermined negative pressure. If 420 is true, the diagnostic module 260 may indicate that the fault associated with the purge pressure sensor 146 is present and initiate one or more remedial actions at 424. If 420 is false, the diagnostic module 260 may indicate that the fault is not present at 428. The example of FIG. 4 may be illustrative of one control loop, and control loops may be started at a predetermined rate.

Referring back to FIG. 3, a target flow module 280 determines a target purge flow rate 284 to the engine 12. The target purge flow rate 284 may correspond, for example, to a target mass flow rate of fuel vapor through the purge valve 106. The target flow module 280 may determine the target purge flow rate 284, for example, based on a mass air flowrate (MAF) 288 and one or more fueling parameters 292. The target flow module 280 may determine the target purge flow rate 284, for example, using one or more functions or mappings that relate MAFs and fueling parameter(s) to target purge flow rate. The fueling parameter(s) 292 may include, for example, a mass of (liquid) fuel injected per combustion event, a mass of air trapped within a cylinder per combustion event, a target air/fuel mixture, and/or one or more other fueling parameters. The fueling parameter(s) 292 may be provided, for example, by a fuel control module of the ECM 30 that controls the fuel injection system 16.

A feed forward (FF) module 296 determines a FF value 300 based on the target purge flow rate 284. In one example, the FF value 300 is a target purge flow rate through the purge valve 106. The FF module 296 may determine the FF value 300, for example, using a function or a mapping that relates target purge flow rates to FF values.

A target purge pressure module 304 determines a target purge pressure 308 based on the target purge flow rate 284. The target purge pressure 308 also corresponds to a target pressure at the purge pressure sensor 146. The target purge pressure module 304 may determine the target purge pressure 308, for example, using a function or a mapping that relates target purge flow rates to target purge pressures. The target purge pressure 308, however, will be used for closed loop control.

A closed loop (CL) module 312 determines a CL adjustment value 316 based on a difference between the target purge pressure 308 and the adjusted purge pressure 232 for a given control loop. The CL module 312 determines the CL adjustment value 316 using a CL controller, such as a proportional integral (PI) CL controller, a proportional, integral, derivative (PID) CL controller, or another suitable type of CL controller.

A summer module 320 determines a final target value 324 based on the CL adjustment value 316 and the FF value 300. For example, the summer module 320 may set the final target value 324 based on or equal to a sum of the CL adjustment value 316 and the FF value 300. In the example of the FF value 300 being a flow rate through the purge valve 106, the final target value 324 is also a target flow rate through the purge valve 106.

A target determination module 328 determines targets for opening of the purge valve 106 and for controlling the purge pump 108 based on the final target value 324. The target determination module 328 determines the targets collectively based on the final target value 324 since both the output of the purge pump 108 and opening of the purge valve 106 both affect the pressure at the purge pressure sensor 146.

For example, the target determination module 328 may determine a target effective opening 332 of the purge valve 106 and a target speed 336 of the purge pump 108 based on the final target value 324. The target determination module 328 may determine the target effective opening 332 and the target speed 336 using one or more functions or mappings that relate final target values to target effective openings and target speeds. As stated above, in some implementations, the purge pump 108 may be a fixed speed pump. In such implementations, the target determination module 328 may set the target speed 336 to the predetermined fixed speed and determine the target effective opening 332 based on the final target value 324 given the use of the predetermined fixed speed.

A motor control module 340 controls application of electrical power to the electric motor of the purge pump 108 based on the target speed 336. For example, the motor control module 340 may control switching of a motor driver (not shown), such as an inverter, based on the target speed 336. Power may be provided to the purge pump 108, for example, from a battery 344 or another energy storage device of the vehicle.

The target effective opening 332 may correspond to a value between 0 percent (for maintaining the purge valve 106 closed) and 100 percent (for maintaining the purge valve 106 open). A purge valve control module 348 controls application of electrical power, such as from the battery 344, to the purge valve 106 based on the target effective opening 332.

For example, the purge valve control module 348 may determine a target duty cycle to be applied to the purge valve 106 based on the target effective opening 332. The purge valve control module 348 may determine the target duty cycle, for example, using a function or mapping that relates target effective openings to target duty cycles. In the example where the target effective opening 332 corresponds to a percentage between 0 and 100 percent, the purge valve control module 348 may use the target effective opening 332 as the target duty cycle. The purge valve control module 348 applies power to the purge valve 106 at the target duty cycle.

The vent valve control module 254 may open the vent valve 112, for example, when the purge valve 106 is open and the purge pump 108 is turned on. For example, the vent valve control module 254 may open the vent valve 112 when the target effective opening 332 is greater than zero and/or the target speed 336 is greater than zero. Opening the vent valve 112 allows fresh air to flow into the vapor canister 104 while the purge pump 108 pumps purge vapor from the vapor canister 104 through the purge valve 106 to the intake system 14.

Figure 5:
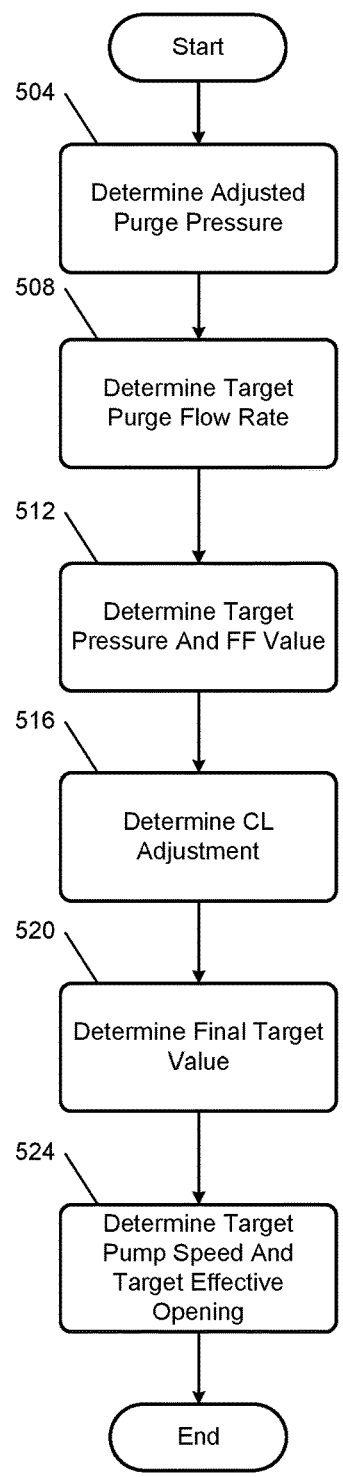
FIG. 5 includes a flowchart depicting an example method of controlling the purge valve and the purge pump.

FIG. 5 includes a flowchart depicting an example method of controlling the purge valve 106 and the purge pump 108. Control begins with 504 where the adjusting module 224 determines the adjusted purge pressure 232, as discussed above. At 508, the target flow module 280 determines the target purge flow rate 284 based on the MAF 288 and the fueling parameter(s) 292. At 512, the target purge pressure module 304 and the FF module 296 determine the target purge pressure 308 and the FF value 300, respectively, based on the target purge flow rate 284.

At 516, the CL module 312 determines the CL adjustment value 316 based on a difference between the target purge pressure 308 and the adjusted purge pressure 232. The summer module 320 determines the final target value 324 based on the CL adjustment value 316 and the FF value 300 at 520. For example, the summer module 320 may set the final target value 324 based on or equal to the CL adjustment value 316 and the FF value 300.

At 524, the target determination module 328 may determine the target effective opening 332 for the purge valve 106 and the target speed 336 for the purge pump 108 based on the final target value 324. The purge valve control module 348 controls opening of the purge valve 106 based on the target effective opening 332, and the motor control module 340 controls the speed of the purge pump 108 based on the target speed 336. The example of FIG. 5 may be illustrative of one control loop, and control loops may be started at the predetermined rate.

Figure 6:
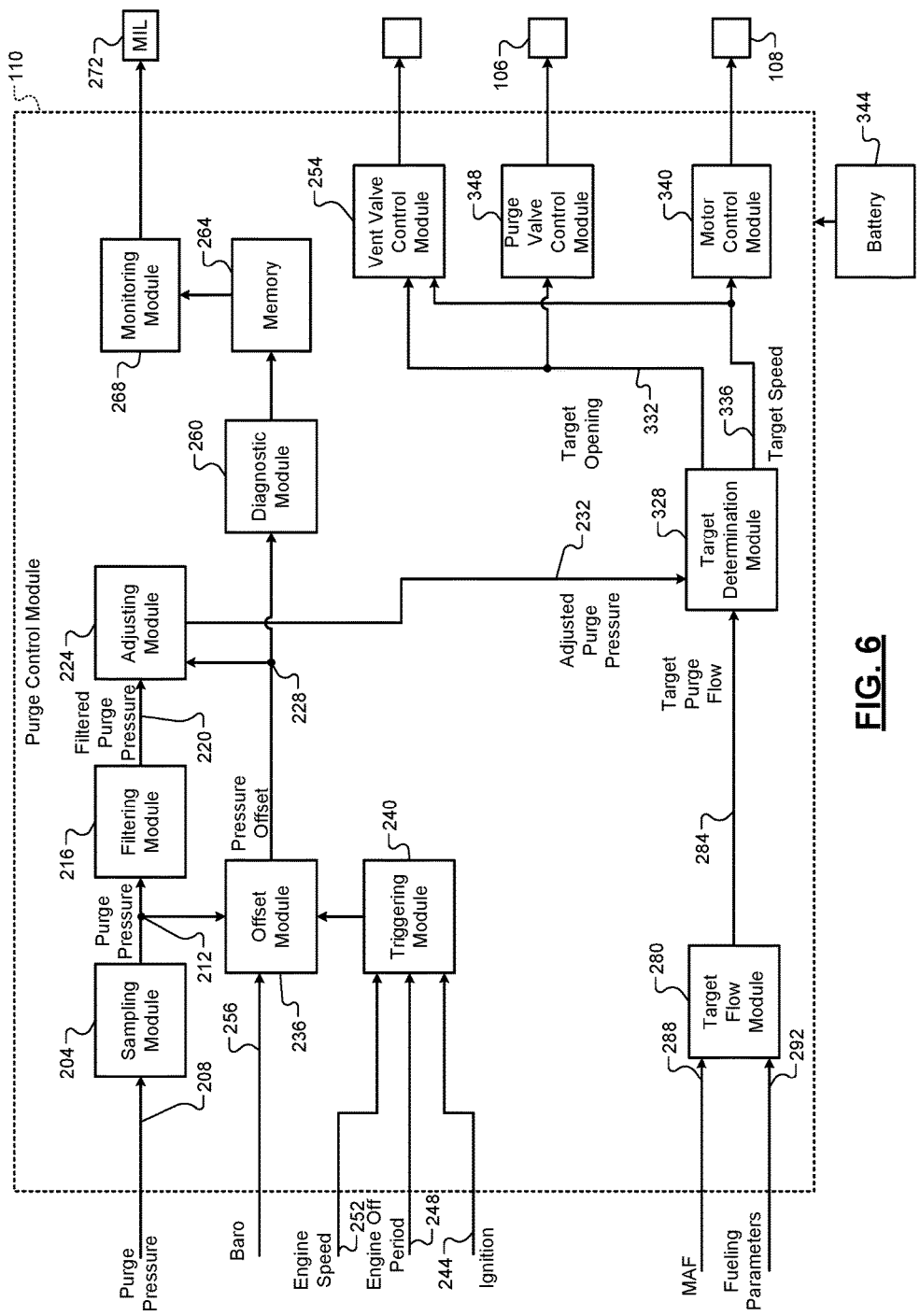
FIG. 6 includes a functional block diagram of an example implementation of a purge control module.

FIG. 6 includes a functional block diagram of an example implementation of the purge control module 110. The example of FIG. 6 provides a system without CL control. The target flow module 280 determines the target purge flow rate 284, as discussed above.

In the example of FIG. 6, the target determination module 328 determines targets for opening of the purge valve 106 and for controlling the purge pump 108 based on the target purge flow rate 284. The target determination module 328 may determine the targets for opening the purge valve 106 and for controlling the purge pump 108 further based on the adjusted purge pressure 232. The target determination module 328 determines the targets collectively since both the output of the purge pump 108 and opening of the purge valve 106 both affect the pressure at the purge pressure sensor 146.

Figure 7:
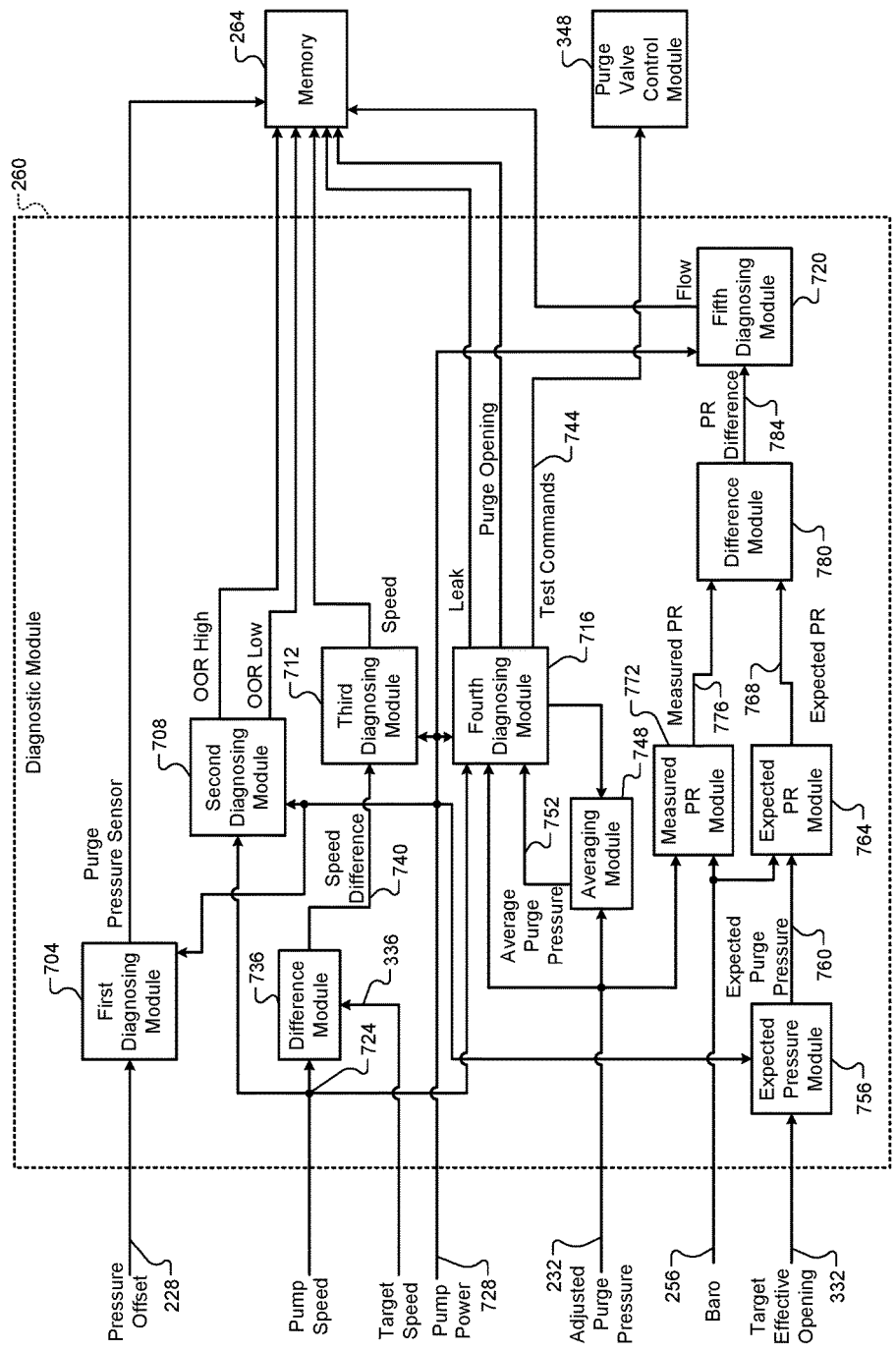
FIG. 7 includes a functional block diagram of an example implementation of a diagnostic module.

FIG. 7 is a functional block diagram of an example implementation of the diagnostic module 260 of FIGS. 3 and 6. The diagnostic module 260 includes a first diagnosing module 704 whether the pressure offset 228 is indicative of the fault associated with the purge pressure sensor 146, as discussed above. The first diagnosing module 704 sets the predetermined DTC in the memory 264 to indicate whether the fault associated with the purge pressure sensor 146 is present.

Figure 8:
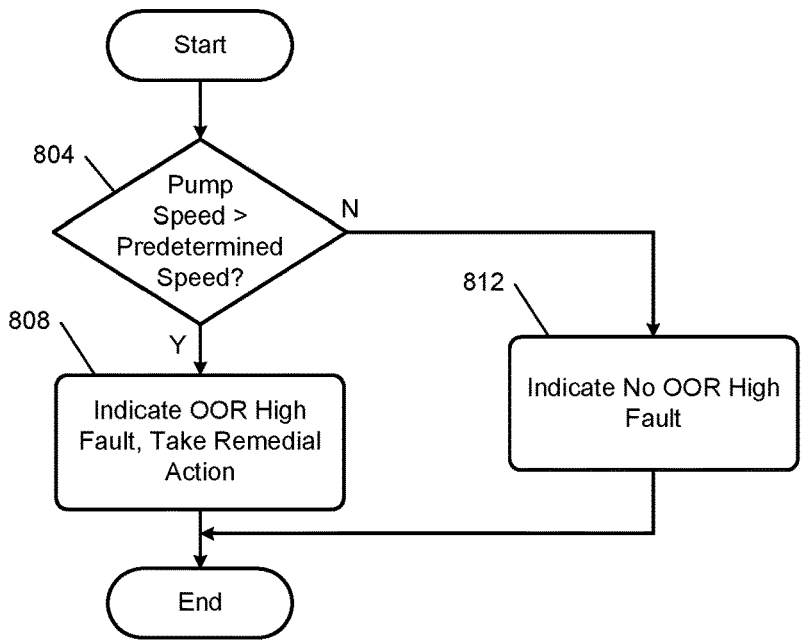
FIG. 8 is a flowchart depicting an example method of diagnosing an out of range (OOR) high fault that may be performed by the diagnostic module.
Figure 9:
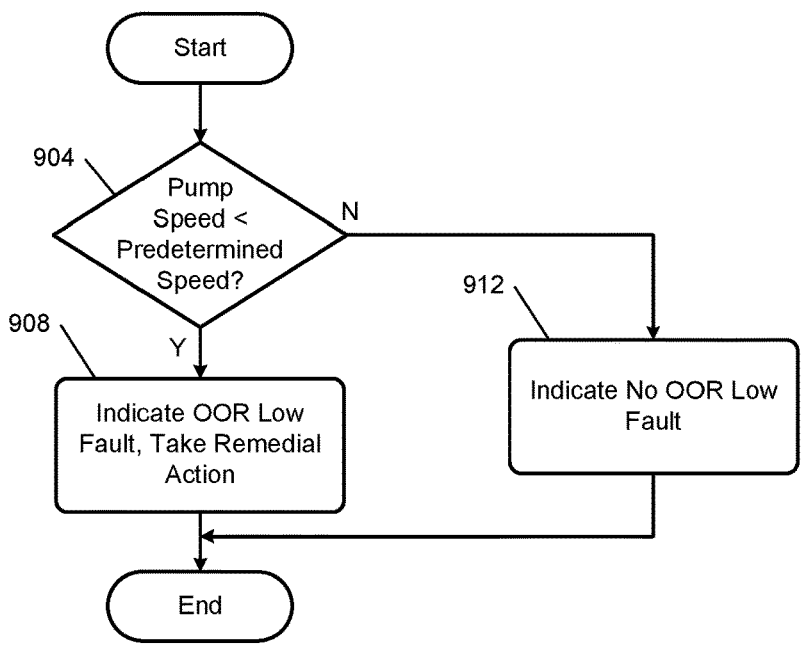
FIG. 9 is a flowchart depicting an example method of diagnosing an OOR low fault that may be performed by the diagnostic module.

The diagnostic module 260 also includes second, third, fourth, and fifth diagnosing modules 708, 712, 716, and 720, respectively, that diagnose whether other types of faults are present. FIG. 8 includes a flowchart depicting an example method of diagnosing whether an out of range (OOR) high fault is present in the pump speed sensor. FIG. 9 includes a flowchart depicting an example method of diagnosing whether an out of range (OOR) low fault is present in the pump speed sensor. Operation of the second diagnosing module 708 will be discussed in conjunction with FIGS. 7, 8, and 9.

Referring now to FIGS. 7 and 8, control begins with 804 where the second diagnosing module 708 may determine whether a pump speed 724 is greater than a predetermined maximum value of the pump speed 724. The pump speed 724 is measured using a pump speed sensor. The pump speed sensor is one of the pump sensors 150 of FIG. 2 and measures a rotational speed of the purge pump 108.

The pump speed 724 being greater than the predetermined maximum value indicates that a fault is present, such as in the purge pump 108 or the pump speed sensor. The predetermined maximum value may be a fixed value or variable. In the example of the predetermined maximum value being variable, the second diagnosing module 708 may determine the predetermined maximum value, for example, based on the current to the purge pump 108, the voltage applied to the purge pump 108, and/or the power consumption of the purge pump 108. Current to the purge pump 108, voltage applied to the purge pump 108, and/or power consumption of the purge pump 108 are illustrated by 728 in FIG. 7. Current to the purge pump 108, voltage applied to the purge pump 108, and/or power consumption of the purge pump 108 may be measured using one or more of the pump sensors 150. The second diagnosing module 708 may determine the predetermined maximum value, for example, using a function or mapping that relates current, voltage, and/or power consumption of the purge pump 108 to predetermined maximum values. The densities of fuel vapor and air may be different. As such, current, voltage, and/or power consumption of the purge pump 108 may vary as the composition of gas at the purge pump 108 changes. The predetermined maximum values may therefore vary based on current, voltage, and/or power consumption of the purge pump 108.

If 804 is true, the second diagnosing module 708 indicates that an out of range (OOR) high fault is present at 808. One or more remedial actions may also be taken at 808. For example, the second diagnosing module 708 may store a predetermined diagnostic trouble code (DTC) in the memory 264 when the OOR high fault is diagnosed. The predetermined DTC may correspond to the OOR high fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the OOR high fault is diagnosed, such as disabling fuel vapor purging. If 804 is false, the second diagnosing module 708 indicates that the OOR high fault is not present in the pump speed sensor at 812. The example of FIG. 8 may be illustrative of one control loop, and control loops may be started at a predetermined rate.

Referring now to FIGS. 7 and 9, control begins with 904 where the second diagnosing module 708 may determine whether the pump speed 724 is less than a predetermined minimum value of the pump speed 724. As stated above, the pump speed 724 is measured using the pump speed sensor.

The pump speed 724 being less than the predetermined minimum value indicates that a fault is present, such as in the purge pump 108 or in the pump speed sensor. The predetermined minimum value may be a fixed value or variable. In the example of the predetermined minimum value being variable, the second diagnosing module 708 may determine the predetermined minimum value, for example, based on the current to the purge pump 108, the voltage applied to the purge pump 108, and/or the power consumption of the purge pump 108. The second diagnosing module 708 may determine the predetermined minimum value, for example, using a function or mapping that relates current, voltage, and/or power consumption of the purge pump 108 to predetermined minimum values.

If 904 is true, the second diagnosing module 708 indicates that an out of range (OOR) low fault is present at 908. One or more remedial actions may also be taken at 908. For example, the second diagnosing module 708 may store a predetermined diagnostic trouble code (DTC) in the memory 264 when the OOR low fault is diagnosed. The predetermined DTC may correspond to the OOR low fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the OOR low fault is diagnosed, such as disabling fuel vapor purging. If 904 is false, the second diagnosing module 708 indicates that the OOR low fault is not present at 912. The example of FIG. 9 may be illustrative of one control loop, and control loops may be started at a predetermined rate.

Figure 10:
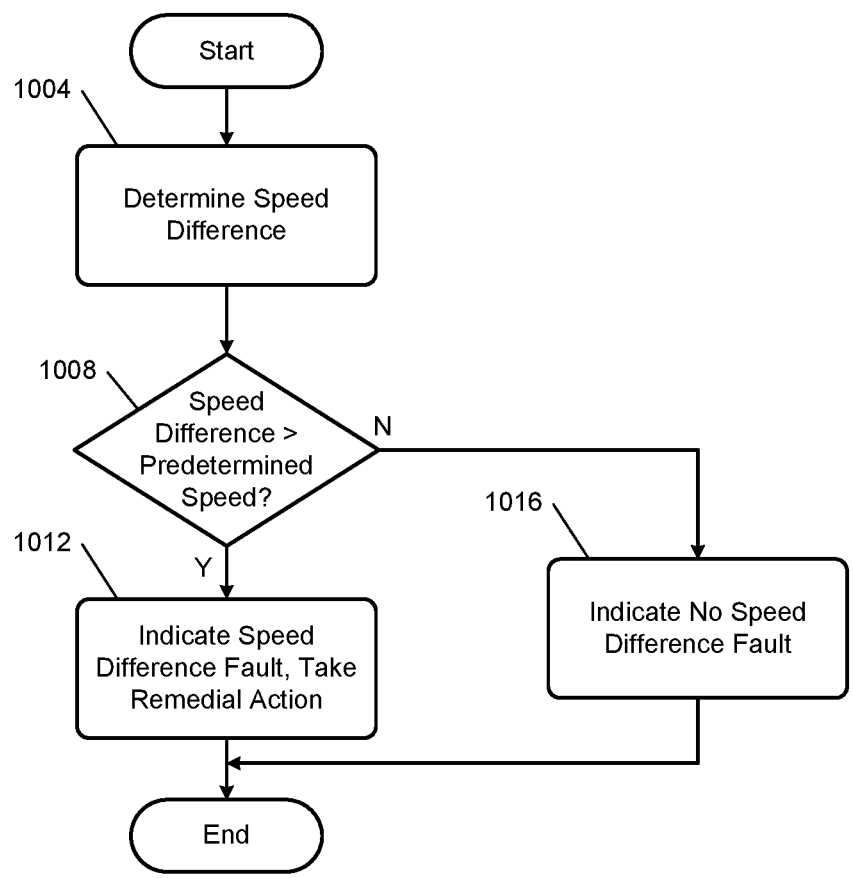
FIG. 10 is a flowchart depicting an example method of diagnosing a speed difference fault that may be performed by the diagnostic module.

Operation of the third diagnosing module 712 will be discussed in conjunction with FIGS. 7 and 10. Referring now to FIGS. 7 and 10, control begins with 1004 where a difference module 736 determines a speed difference 740. The difference module 736 sets the speed difference 740 based on or equal to a difference between the pump speed 724 and the target speed 336 of the purge pump 108.

At 1008, the third diagnosing module 712 determines whether the speed difference 740 is within a predetermined range around zero. The speed difference 740 being outside of the predetermined range (i.e., being greater than a predetermined positive speed or less than a predetermined negative speed) indicates that a fault associated with the pump speed is present. The fault may be attributable, for example, to the pump speed sensor or the determination of the target speed 336. The predetermined range may be a fixed or variable. In the example of the predetermined range being variable, the third diagnosing module 712 may determine the predetermined range, for example, based on the current to the purge pump 108, the voltage applied to the purge pump 108, and/or the power consumption of the purge pump 108. The third diagnosing module 712 may determine the predetermined range, for example, using a function or mapping that relates current, voltage, and/or power consumption of the purge pump 108 to predetermined ranges.

If 1008 is true, the third diagnosing module 712 indicates that a speed difference fault associated with the pump speed is present at 1012. One or more remedial actions may also be taken at 1012. For example, the third diagnosing module 712 may store a predetermined diagnostic trouble code (DTC) in the memory 264 when the speed difference fault is diagnosed. The predetermined DTC may correspond to a speed difference fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the speed difference fault is diagnosed, such as disabling fuel vapor purging. If 1008 is false, the third diagnosing module 712 indicates that the speed difference fault is not present at 1016. The example of FIG. 10 may be illustrative of one control loop, and control loops may be started at a predetermined rate.

Figure 11A:
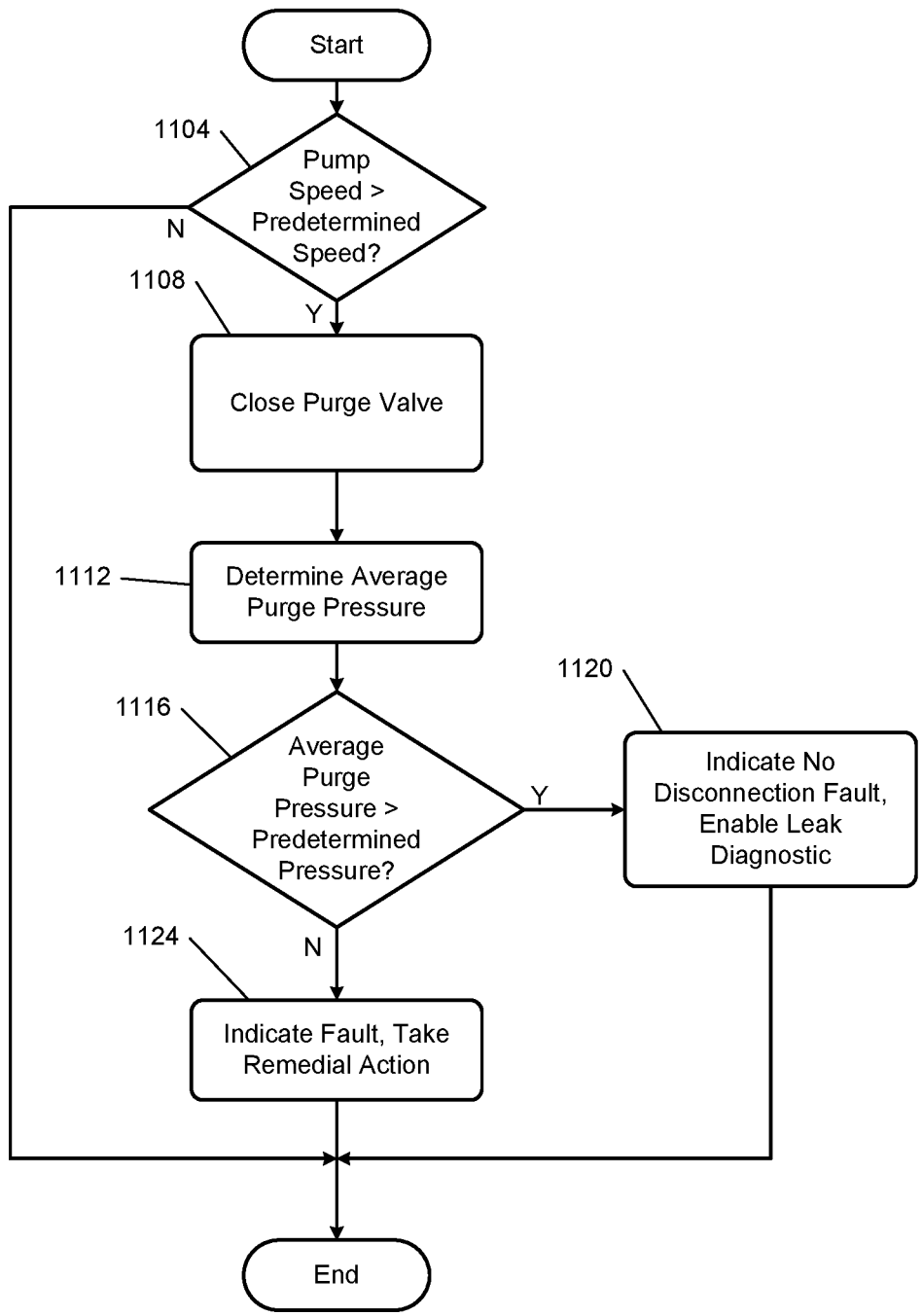
FIG. 11A is a flowchart depicting an example method of diagnosing a disconnection fault that may be performed by the diagnostic module.

Operation of the fourth diagnosing module 716 will be discussed in conjunction with FIGS. 7, 11A, and 11B. Referring now to FIGS. 7 and 11A, control begins when the purge valve 106 is at least partially open (e.g., when the target effective opening 332 or the target duty cycle is greater than zero percent) and the purge pump 108 is on. Control begins with 1104 where the fourth diagnosing module 716 determines whether the pump speed 724 is greater than a predetermined speed. The predetermined speed corresponds to a speed of the purge pump 108 where a measurable rise in pressure at the purge pressure sensor 146 would occur if the purge valve 106 was closed and maintained closed. If 1104 is true, the fourth diagnosing module 716 commands 744 the purge valve control module 348 to close the purge valve 106 and maintain the purge valve 106 closed, and control continues with 1108. If 1104 is false, control may end.

At 1108, the purge valve control module 348 closes and maintains the purge valve 106 closed (e.g., sets the duty cycle applied to the purge valve 106 to zero percent) in response to the command 744. The fourth diagnosing module 716 also triggers an averaging module 748 to reset an average purge pressure 752 and determine the average purge pressure 752. The averaging module 748 sets the average purge pressure 752 based on or equal to an average of the next N values of the adjusted purge pressure 232. In this manner, the average purge pressure 752 corresponds to an average of the values of the adjusted purge pressure 232 over a predetermined period following the closing of the purge valve 106 (while the purge pump 108 remains on).

At 1116, the fourth diagnosing module 716 determines whether the average purge pressure 752 is greater than a predetermined pressure. The predetermined pressure may be a fixed value or may be variable. In the example of the predetermined pressure being variable, the fourth diagnosing module 716 may set the predetermined pressure, for example, based on or equal to a predetermined amount or percentage greater than the adjusted purge pressure 232 when the purge valve 106 was closed (at 1108). The fourth diagnosing module 716 may determine the predetermined pressure further based on the current to the purge pump 108, the voltage applied to the purge pump 108, and/or the power consumption of the purge pump 108.

If 1116 is true, the fourth diagnosing module 716 may indicate that no disconnection fault is present at 1120 and enable performance of a purge valve leak test (PLVT). If 1116 is false, the fourth diagnosing module 716 may indicate that a disconnection fault is present at 1124. The presence of a disconnection fault may indicate, for example, that the purge pump 108 is disconnected from the purge valve 106, or another disconnection is present that prevented the pressure at the purge pressure sensor 146 from rising sufficiently after the closing of the purge valve 106. The PLVT involves closing the purge valve 106 at a time when the presence of a leak in the purge valve 106 would cause a change in pressure within the fuel tank 102.

One or more remedial actions may also be taken at 1124. For example, the fourth diagnosing module 716 may store a predetermined diagnostic trouble code (DTC) in the memory 264 when the disconnection fault is diagnosed. The predetermined DTC may correspond to a disconnection fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the disconnection fault is diagnosed, such as disabling fuel vapor purging. The example of FIG. 11A may be illustrative of one control loop, and control loops may be started at a predetermined rate.

Figure 11B:
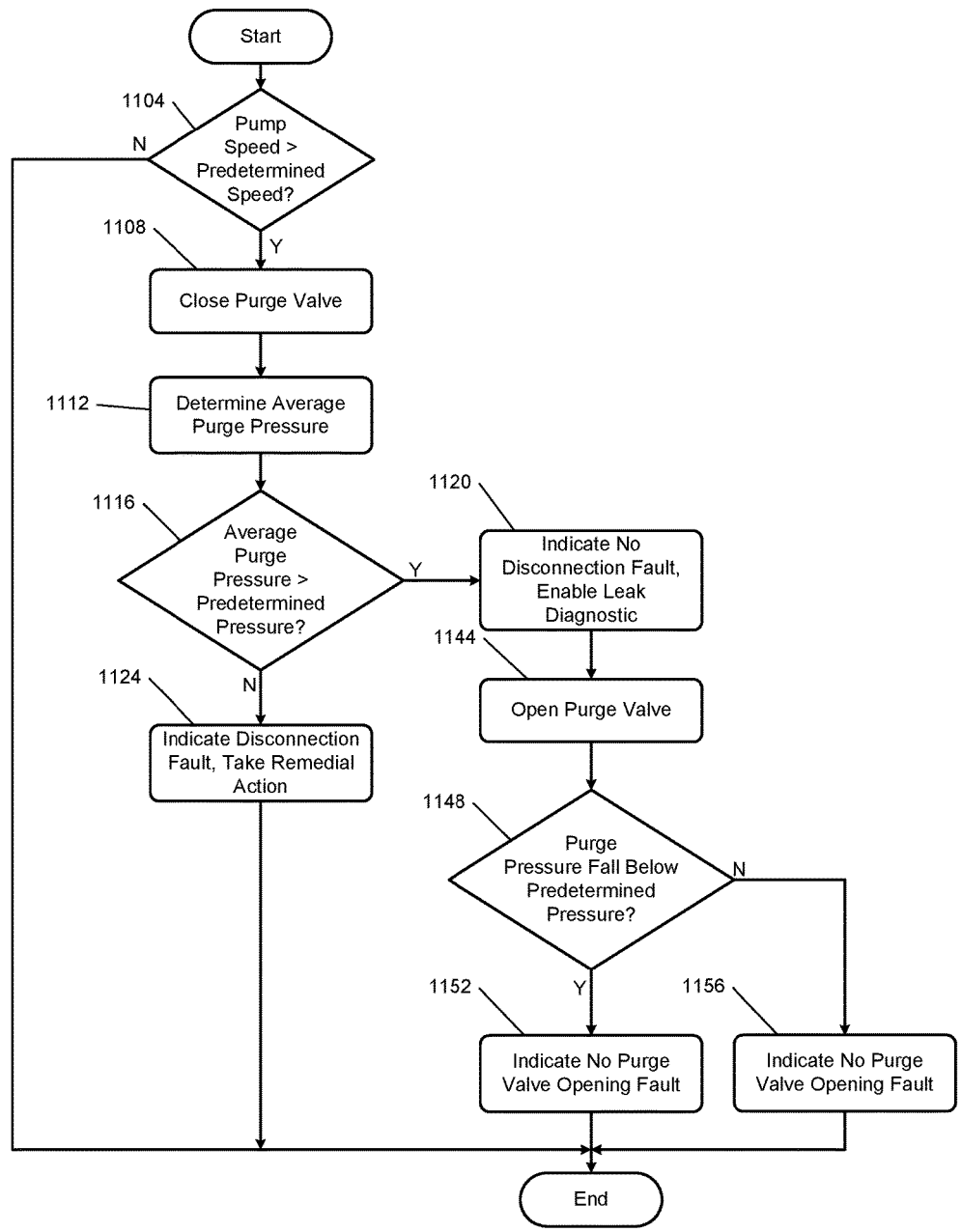
FIG. 11B is a flowchart depicting an example method of diagnosing a disconnection fault and/or diagnosing a purge valve opening fault that may be performed by the diagnostic module.

As illustrated by FIG. 11B, another type of fault may be diagnosed when a disconnection fault is not present. Referring now to FIGS. 7 and 11B, control continues with 1144 after 1120. At 1144, the fourth diagnosing module 716 commands 744 the purge valve control module 348 to open the purge valve 106 and control continues with 1148. After the closing of the purge valve 106, opening the purge valve 106 should cause the adjusted purge pressure 232 to decrease unless opening of the purge valve 106 is restricted or the purge valve 106 opens less than expected. The purge valve control module 348 opens and maintains the purge valve 106 open (e.g., sets the duty cycle applied to the purge valve 106 to 100 percent) in response to the command 744.

The fourth diagnosing module 716 determines whether the adjusted purge pressure 232 falls below a second predetermined pressure within a predetermined period after the opening of the purge valve 106 at 1148. The second predetermined pressure may be a fixed value or may be variable. The second predetermined pressure is less than the predetermined pressure used at 1116. In the example of the second predetermined pressure being variable, the fourth diagnosing module 716 may set the second predetermined pressure, for example, based on or equal to a predetermined amount or percentage greater than the average purge pressure 752 (from 1112). The fourth diagnosing module 716 may determine the second predetermined pressure further based on the current to the purge pump 108, the voltage applied to the purge pump 108, and/or the power consumption of the purge pump 108.

If 1148 is true, the fourth diagnosing module 716 indicates that a purge valve opening fault is not present at 1152. The purge valve opening fault may indicate that opening of the purge valve 106 is restricted or less than expected. If 1148 is false, the fourth diagnosing module 716 indicates that the purge valve opening fault is present at 1156. One or more remedial actions may also be taken at 1148. For example, the fourth diagnosing module 716 may store a predetermined diagnostic trouble code (DTC) in the memory 264 when the purge valve opening fault is diagnosed. The predetermined DTC may correspond to the purge valve opening fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the purge valve opening fault is diagnosed, such as disabling fuel vapor purging. The example of FIG. 11B may be illustrative of one control loop, and control loops may be started at a predetermined rate.

Figure 12:
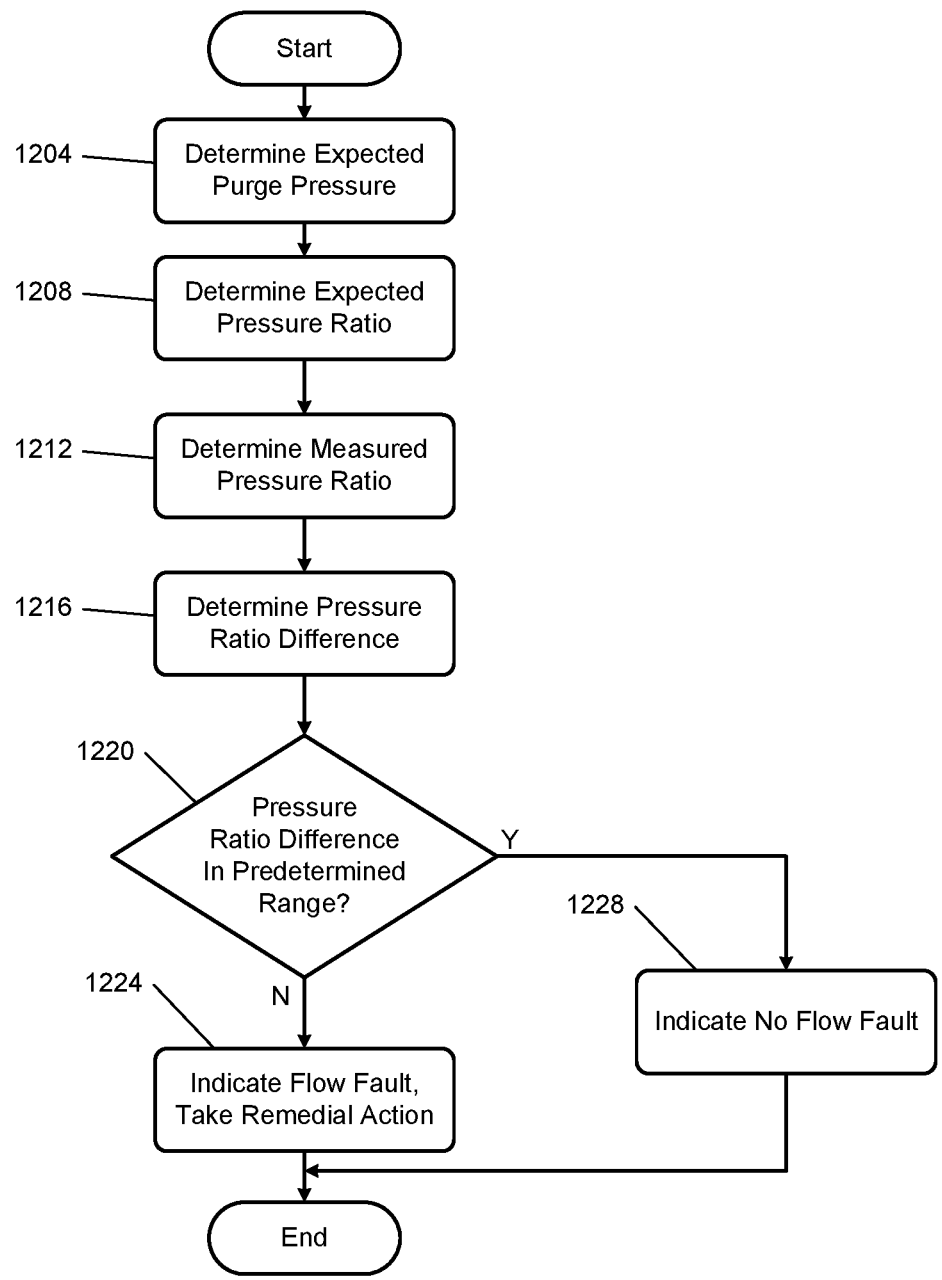
FIGS. 12 and 13 are flowcharts depicting example methods of diagnosing a flow fault that may be performed by the diagnostic module.

Operation of the fifth diagnosing module 720 will be discussed in conjunction with FIGS. 7 and 12. Referring now to FIGS. 7 and 12, control begins with 1204 where an expected pressure module 756 determines an expected purge pressure 760. The expected purge pressure 760 corresponds to an expected pressure at the purge pressure sensor 146. The expected pressure module 756 determines the expected purge pressure 760 based on the target effective opening 332. The expected pressure module 756 may determine the expected purge pressure 760 further based on the pump speed 724 or the target speed 336. For example, the expected pressure module 756 may determine the expected pressure using one or more functions or mappings that relate target effective openings of the purge valve 106, and optionally speeds of the purge pump 108, to expected pressures at the purge pressure sensor 146.

An expected pressure ratio (PR) module 764 determines an expected PR 768 across the purge valve 106 at 1208. The expected PR module 764 determines the expected PR 768 across the purge valve 106 based on the expected purge pressure 760 and a pressure at an outlet of the purge valve 106, such as the pressure at the location between the air filter 19 and the boost device 21. As described above, the barometric pressure 256 may be used as the pressure at the location between the air filter 19 and the boost device 21. The expected PR module 764 may set the expected PR 768 based on or equal to the expected purge pressure 760 divided by the pressure at the location between the air filter 19 and the boost device 21.

A measured PR module 772 determines a measured PR 776 across the purge valve 106 at 1212. The measured PR module 772 determines the measured PR 776 across the purge valve 106 based on the adjusted purge pressure 232 and the pressure at an outlet of the purge valve 106, such as the pressure at the location between the air filter 19 and the boost device 21. As described above, the barometric pressure 256 may be used as the pressure at the location between the air filter 19 and the boost device 21. The measured PR module 772 may set the measured PR 776 based on or equal to the adjusted purge pressure 232 divided by the pressure at the location between the air filter 19 and the boost device 21.

At 1216, a difference module 780 determines a PR difference 784 based on the expected PR 768 and the measured PR 776 across the purge valve 106. For example, the difference module 780 may set the PR difference 784 based on or equal to a difference between the expected PR 768 and the measured PR 776. While the example of determining a difference between the expected PR 768 and the measured PR 776 is provided, a ratio (or quotient) of the measured PR 776 to (or divided by) the expected PR 768 may be used in various implementations.

The fifth diagnosing module 720 determines whether a flow fault is present at 1220 based on whether the PR difference 784 is within a predetermined range around zero. If 1220 is false (i.e., the PR difference 784 is greater than a predetermined positive value or less than a predetermined negative value), the fifth diagnosing module 720 indicates that a flow fault is present at 1224. If 1220 is true, the fifth diagnosing module 720 indicates that a flow fault is not present at 1228.

The presence of the flow fault may indicate that fuel vapor flow through the purge valve 106 is greater or less than expected. The predetermined range may be a fixed or variable. In the example of the predetermined range being variable, the fifth diagnosing module 720 may determine the predetermined range, for example, based on the current to the purge pump 108, the voltage applied to the purge pump 108, and/or the power consumption of the purge pump 108. The fifth diagnosing module 720 may determine the predetermined range, for example, using one or more functions or mappings that relate current, voltage, and/or power consumption of the purge pump 108 to upper and lower limits of the predetermined range.

One or more remedial actions may also be taken at 1224. For example, the fifth diagnosing module 720 may store a predetermined diagnostic trouble code (DTC) in the memory 264 when the flow fault is diagnosed. The predetermined DTC may correspond to the flow fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the flow fault is diagnosed, such as disabling fuel vapor purging. The example of FIG. 12 may be illustrative of one control loop, and control loops may be started at a predetermined rate.

Figure 13:
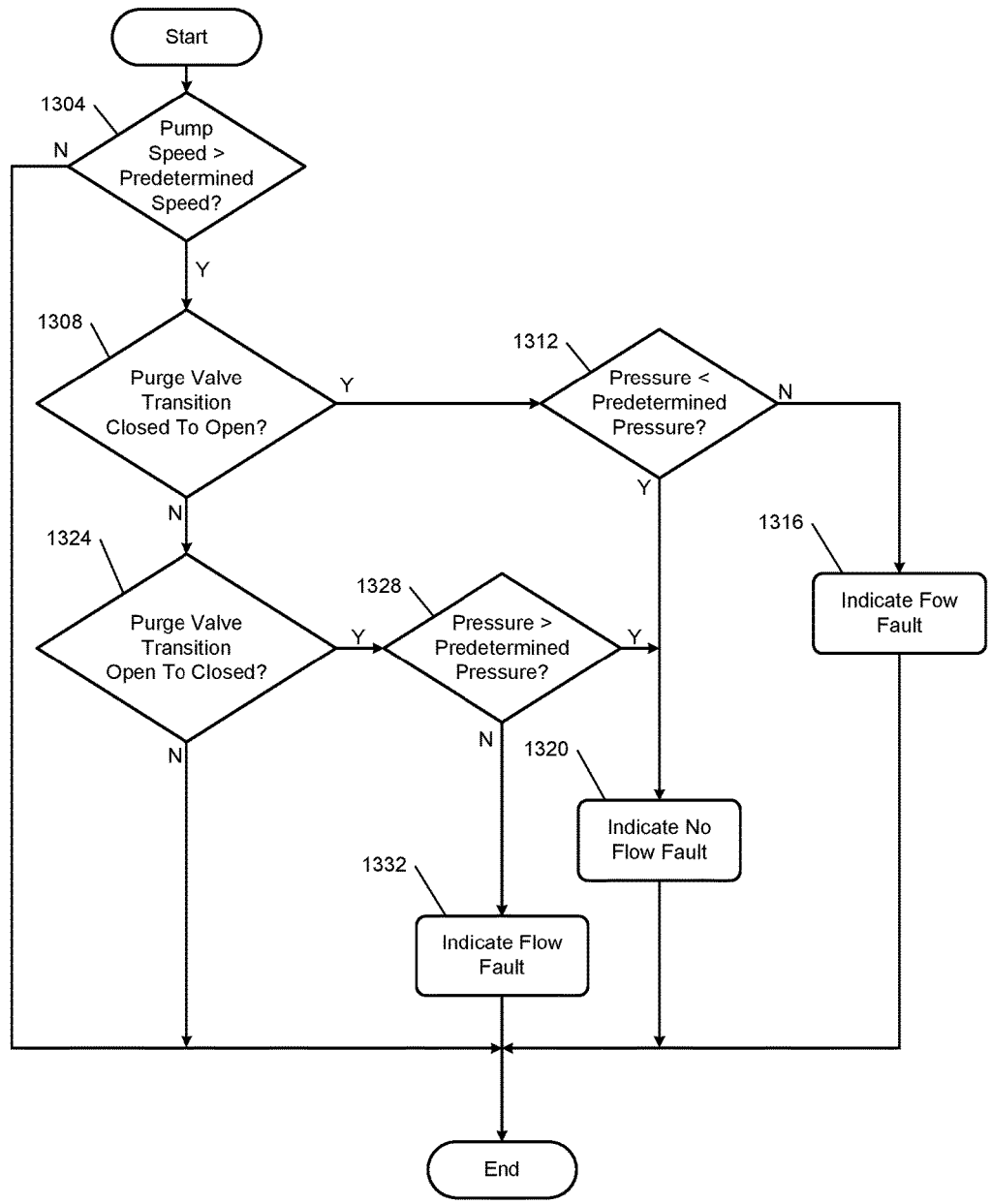

Operation of the fifth diagnosing module 720 will further be discussed in conjunction with FIG. 13. Referring now to FIGS. 7 and 13, control begins with 1304 where the fifth diagnosing module 720 determines whether the pump speed 724 is greater than a predetermined speed. If 1304 is true, control continues with 1308. If 1304 is false, control may end.

At 1308, the fifth diagnosing module 720 determines whether the purge valve 106 has been commanded to transition from being closed to being open. For example, the fifth diagnosing module 720 may determine whether the target effective opening 332 has transitioned from less than a predetermined value to greater than the predetermined value. An example of the predetermined value is 5 percent, although another predetermined value may be used. If 1308 is true, control continues with 1312. If 1308 is false, control continues with 1324, which is discussed further below.

At 1312, the fifth diagnosing module 720 may determine whether the adjusted purge pressure 232 is less than a predetermined pressure. The fifth diagnosing module 720 may determine the predetermined pressure, for example, based on a predetermined amount or percentage less than the adjusted purge pressure 232 when the opening of the purge valve 106 occurred. If 1312 is true, the fifth diagnosing module 720 indicates that no flow fault is present at 1320, and control may end. If 1312 is false, the fifth diagnosing module 720 may indicate that a flow fault is present at 1316, and control may end. In various implementations, the fifth diagnosing module 720 may require that 1312 be satisfied for at least a predetermined period after the opening of the purge valve 106 before continuing with 1316.

Referring back to 1324, the fifth diagnosing module 720 may determine whether the purge valve 106 has been commanded to transition from being open to being closed. For example, the fifth diagnosing module 720 may determine whether the target effective opening 332 has transitioned from less than a second predetermined value to greater than the second predetermined value. An example of the predetermined value is 95 percent, although another predetermined value may be used. If 1324 is false, control may end. If 1324 is true, control may continue with 1328.

At 1328, the fifth diagnosing module 720 may determine whether the adjusted purge pressure 232 is greater than a second predetermined pressure. If 1328 is true, the fifth diagnosing module 720 indicates that no flow fault is present at 1320, and control may end. If 1328 is false, the fifth diagnosing module 720 may indicate that a flow fault is present at 1316, and control may end. In various implementations, the fifth diagnosing module 720 may require that 1328 be satisfied for at least a predetermined period after the opening of the purge valve 106 before continuing with 1332. The presence of the flow fault may indicate that fuel vapor flow through the purge valve 106 is greater or less than expected.

One or more remedial actions may also be taken at 1316 or 1332. For example, the fifth diagnosing module 720 may store a predetermined diagnostic trouble code (DTC) in the memory 264 when the flow fault is diagnosed. The predetermined DTC may correspond to the flow fault being present. As stated above, the monitoring module 268 may monitor the memory 264 and illuminate the MIL 272 within the passenger cabin of the vehicle when one or more DTCs are stored in the memory 264. Additionally or alternatively, one or more other remedial actions may be taken when the flow fault is diagnosed, such as disabling fuel vapor purging. The example of FIG. 13 may be illustrative of one control loop, and control loops may be started at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A fuel vapor system for a vehicle, comprising:
   a fuel vapor canister that traps fuel vapor from a fuel tank of the vehicle;
   a purge valve that opens to allow fuel vapor flow to an intake system of an engine and that closes to prevent fuel vapor flow to the intake system of the engine;
   an electrical pump that pumps fuel vapor from the fuel vapor canister to the purge valve; and
   a diagnostic module that (a) selectively diagnoses a fault in the fuel vapor system based on a pressure at a location between the electrical pump and the purge valve, and that (b) illuminates a malfunction indicator lamp (MIL) within a passenger cabin of the vehicle when the fault is diagnosed,
   wherein the diagnostic module:
      selectively closes the purge valve when the electrical pump is on; and
      diagnoses the fault based on an average of values of the pressure at the location between the electrical pump and the purge valve taken after the closing of the purge valve.

2. The fuel vapor system of claim 1 wherein the diagnostic module selectively diagnoses the fault further based on a speed of the electrical pump measured using a pump speed sensor, and wherein the diagnostic module diagnoses the fault when the speed of the electrical pump measured using the pump speed sensor is greater than a predetermined maximum speed measurable by the pump speed sensor.

3. The fuel vapor system of claim 1 wherein the diagnostic module selectively diagnoses the fault further based on a speed of the electrical pump measured using a pump speed sensor, and wherein the diagnostic module diagnoses the fault when the speed of the electrical pump measured using the pump speed sensor is less than a predetermined minimum speed measurable by the pump speed sensor.

4. The fuel vapor system of claim 1 wherein the diagnostic module selectively diagnoses the fault further based on a speed of the electrical pump measured using a pump speed sensor, and wherein the diagnostic module diagnoses the fault when a difference between the speed of the electrical pump measured using the pump speed sensor and a target speed of the electrical pump is one of: greater than a first predetermined speed that is greater than zero; and less than a second predetermined speed that is less than zero.

5. The fuel vapor system of claim 1 wherein the diagnostic module closes the purge valve in response to a determination that a speed of the electrical pump measured using a pump speed sensor is greater than a predetermined speed.

6. The fuel vapor system of claim 1 wherein the diagnostic module diagnoses the fault when the average of the values of the pressure at the location between the electrical pump and the purge valve taken after the closing of the purge valve is less than a predetermined pressure.

7. The fuel vapor system of claim 1 wherein the diagnostic module further:
selectively opens the purge valve after the closing of the purge valve; and
diagnoses the fault when the pressure at the location between the electrical pump and the purge valve is not less than a predetermined pressure within a predetermined period after the opening of the purge valve.

8. The fuel vapor system of claim 7 wherein the diagnostic module opens the purge valve after the closing of the purge valve when the average is greater than a second predetermined pressure that is greater than the predetermined pressure.

9. The fuel vapor system of claim 1 wherein the diagnostic module:
determines a measured value based on a barometric pressure and the pressure at the location between the electrical pump and the purge valve;
determines an expected value based on the barometric pressure and a target pressure at the location between the electrical pump and the purge valve; and
selectively diagnoses the fault based on the measured value and the expected value.

10. A method for a vehicle, comprising:
pumping, using an electrical pump, fuel vapor from a fuel vapor canister to a purge valve, the fuel vapor canister trapping fuel vapor from a fuel tank of the vehicle;
selectively opening the purge valve to allow fuel vapor flow to an intake system of an engine;
selectively closing the purge valve to prevent fuel vapor flow to the intake system of the engine;
selectively diagnosing a fault in a fuel vapor system based on a pressure at a location between the electrical pump and the purge valve;
selectively closing the purge valve when the electrical pump is on;
diagnosing the fault based on an average of values of the pressure at the location between the electrical pump and the purge valve taken after the closing of the purge valve; and
illuminating a malfunction indicator lamp (MIL) within a passenger cabin of the vehicle when the fault is diagnosed.

11. The method of claim 10 further comprising:
selectively diagnosing the fault in a fuel vapor system further based on a speed of the electrical pump measured using a pump speed sensor; and
diagnosing the fault when the speed of the electrical pump measured using the pump speed sensor is greater than a predetermined maximum speed measurable by the pump speed sensor.

12. The method of claim 10 further comprising:
selectively diagnosing the fault in a fuel vapor system further based on a speed of the electrical pump measured using a pump speed sensor; and
diagnosing the fault when the speed of the electrical pump measured using the pump speed sensor is less than a predetermined minimum speed measurable by the pump speed sensor.

13. The method of claim 10 further comprising:
selectively diagnosing the fault in a fuel vapor system further based on a speed of the electrical pump measured using a pump speed sensor; and
diagnosing the fault when a difference between the speed of the electrical pump measured using the pump speed sensor and a target speed of the electrical pump is one of:
greater than a first predetermined speed that is greater than zero; and
less than a second predetermined speed that is less than zero.

14. The method of claim 10 wherein selectively closing the purge valve includes closing the purge valve in response to a determination that a speed of the electrical pump measured using a pump speed sensor is greater than a predetermined speed.

15. The method of claim 10 further comprising diagnosing the fault when the average of the values of the pressure at the location between the electrical pump and the purge valve taken after the closing of the purge valve is less than a predetermined pressure.

16. The method of claim 10 further comprising:
selectively opening the purge valve after the closing of the purge valve; and
diagnosing the fault when the pressure at the location between the electrical pump and the purge valve is not less than a predetermined pressure within a predetermined period after the opening of the purge valve.

17. The method of claim 16 wherein selectively opening the purge valve includes opening the purge valve after the closing of the purge valve when the average is greater than a second predetermined pressure that is greater than the predetermined pressure.

18. The method of claim 10 further comprising:
determining a measured value based on a barometric pressure and the pressure at the location between the electrical pump and the purge valve;
determining an expected value based on the barometric pressure and a target pressure at the location between the electrical pump and the purge valve; and
selectively diagnosing the fault based on the measured value and the expected value.

* * * * *